US010894463B2

(12) United States Patent
Ito et al.

(10) Patent No.: US 10,894,463 B2
(45) Date of Patent: Jan. 19, 2021

(54) AIR-CONDITIONING REGISTER

(71) Applicant: TOYODA GOSEI CO., LTD., Kiyosu (JP)

(72) Inventors: Kenichi Ito, Kiyosu (JP); Hiroshi Sakai, Hamamatsu (JP); Ryo Suganuma, Hamamatsu (JP); Mikiyoshi Suga, Hamamatsu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 265 days.

(21) Appl. No.: 16/022,783

(22) Filed: Jun. 29, 2018

(65) Prior Publication Data
US 2019/0047375 A1    Feb. 14, 2019

(30) Foreign Application Priority Data

Aug. 10, 2017    (JP) .................................. 2017-155995

(51) Int. Cl.
*B60H 1/34*    (2006.01)

(52) U.S. Cl.
CPC ... *B60H 1/3421* (2013.01); *B60H 2001/3471* (2013.01); *B60H 2001/3492* (2013.01); *B60Y 2306/09* (2013.01)

(58) Field of Classification Search
CPC .......... B60H 1/3421; B60H 2001/3471; B60H 2001/3492; B60Y 2306/09
USPC ....................................................... 454/155
See application file for complete search history.

(56) References Cited

U.S. PATENT DOCUMENTS

2015/0328959 A1    11/2015    Suzuki et al.
2018/0354338 A1    12/2018    Pacher

FOREIGN PATENT DOCUMENTS

| EP | 2505397 A1 | 10/2012 |
|---|---|---|
| JP | 2000-177378 A | 6/2000 |
| JP | 2010-132204 A | 6/2010 |
| JP | 3176607 U | 6/2012 |
| JP | 2016-078557 A | 5/2016 |
| JP | 2016-159845 A | 9/2016 |
| JP | 2016-203695 A | 12/2016 |
| WO | 2017/130056 A1 | 8/2017 |

OTHER PUBLICATIONS

Office Action dated Dec. 1, 2020 issued in corresponding JP patent application No. 2017-155995 (and English machine translation).

*Primary Examiner* — Edelmira Bosques
*Assistant Examiner* — Dana K Tighe
(74) *Attorney, Agent, or Firm* — Posz Law Group, PLC

(57) ABSTRACT

An air-conditioning register includes a retainer, a downstream fin, a knob, an upstream fin, and a fork. The downstream fin is swingably supported by the retainer with a downstream fin pivot. The knob is slidably attached to the downstream fin. The upstream fin has a transmission shaft. The fork is pivotally supported by the knob and includes two fork pivots. The knob includes two pivot receiving portions each having a pivot receiving hole. Each fork pivot is inserted into the pivot receiving hole of the corresponding one of the pivot receiving portions. An overlapping portion is provided at least at part of a location at which the fork and each pivot receiving portion contact each other. Slits are provided at two locations between the two fork pivots of the fork. A region between each slit and the nearest fork pivot constitutes an elastic support portion.

5 Claims, 6 Drawing Sheets

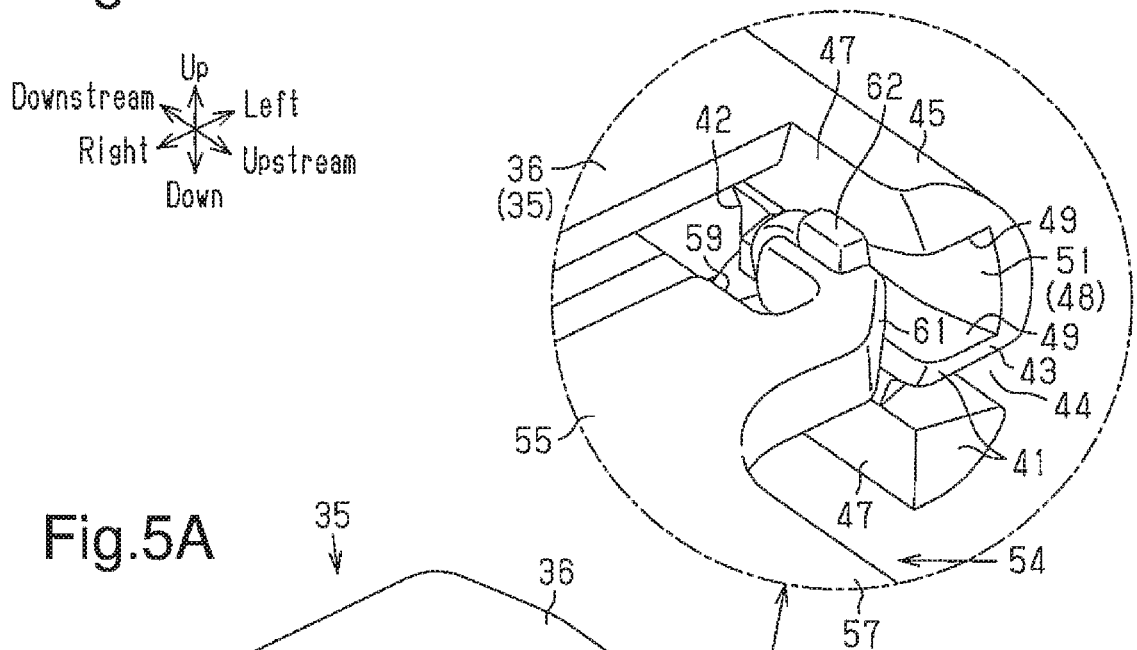
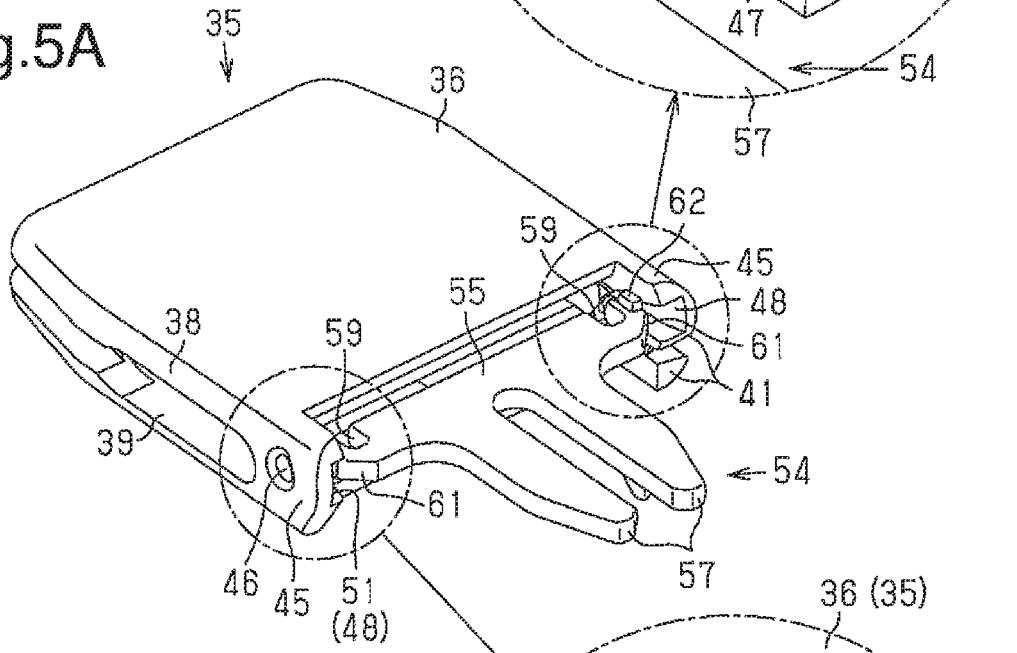
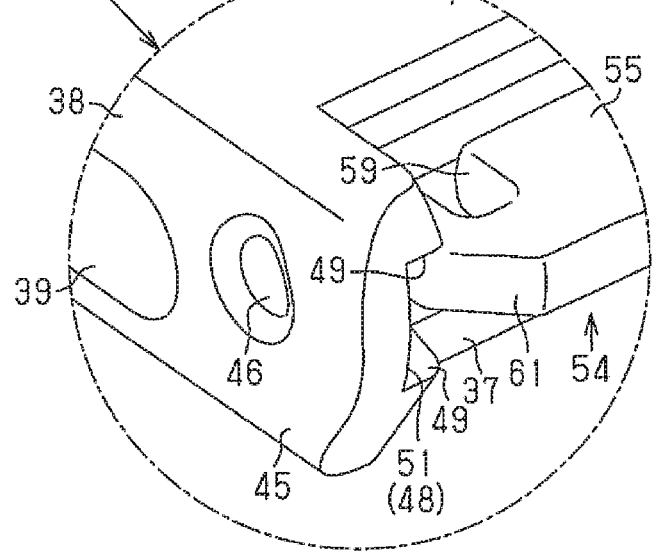

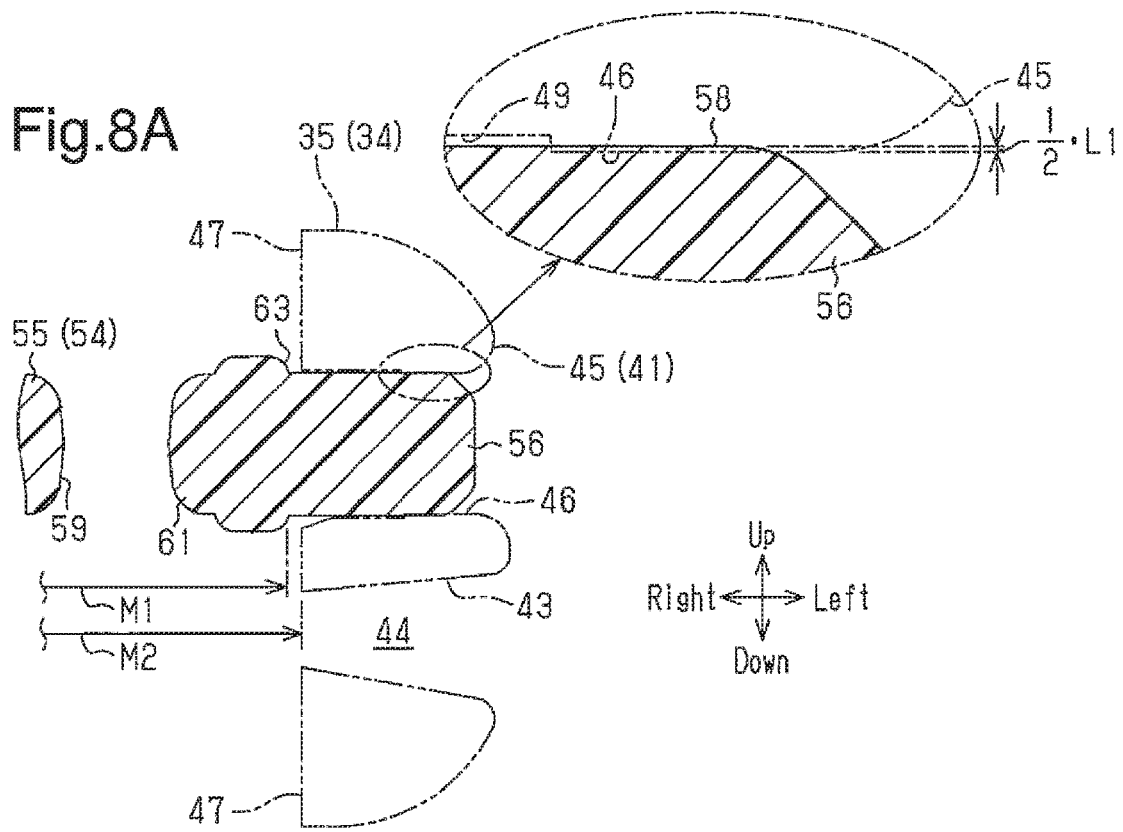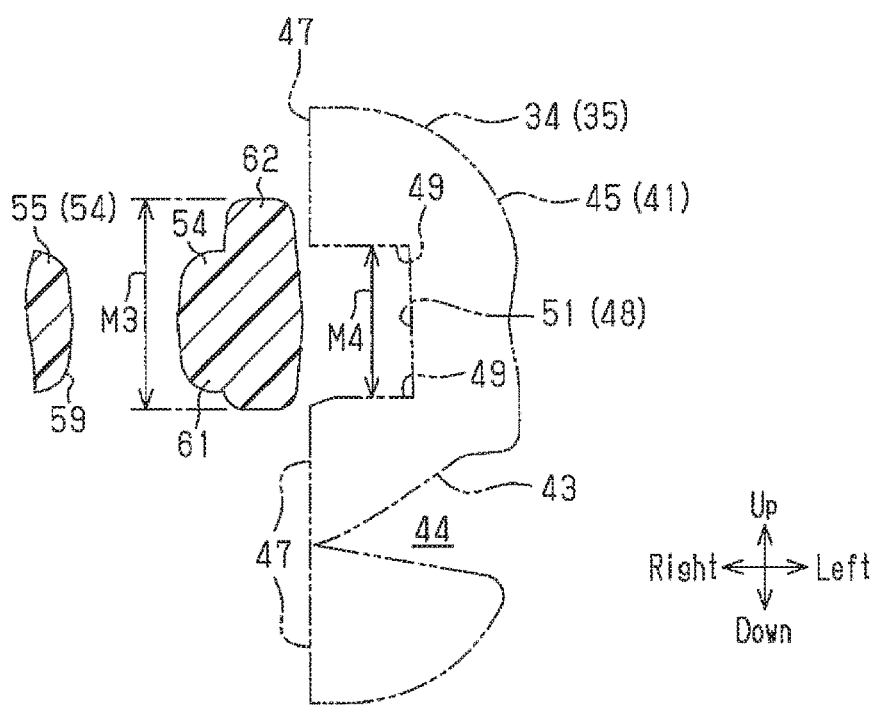

AIR-CONDITIONING REGISTER

BACKGROUND

The present invention relates to an air conditioning register configured to use fins to change the direction of air-conditioning air that is delivered from an air conditioner and blown into a passenger compartment.

For example, the instrument panel of a vehicle incorporates an air-conditioning register that blows out air-conditioning air delivered from the air conditioner. This air-conditioning register has a cylindrical retainer having an air passage for air-conditioning air. Elongated plate-shaped downstream fins are arranged in the air passage. The downstream fins are swingably supported by a retainer with the downstream-fin pivots. Upstream fins are arranged on the upstream side of the downstream fins in the flow direction of the air-conditioning air. The upstream fins include upstream-fin pivots extending in a direction different from that of the downstream-fin pivots and are swingably supported by the retainer with the upstream-fin pivots.

One of the upstream fins has a transmission shaft at the downstream end in the flow direction. The transmission shaft extends along the upstream-fin pivots and functions to swing the upstream fins. A knob is attached to one of the downstream fins so as to be slidable in a direction in which the downstream-fin pivot extends. A fork holding the transmission shaft is assembled to the knob. The fork has fork pivots at the opposite ends in the extending direction of the downstream-fin pivots. The fork pivots extend in the same direction. The knob has two pivot receiving portions. The two pivot receiving portions are separated from each other in the extending direction of the downstream-fin pivots. Each fork pivot is inserted into the pivot receiving hole of the corresponding pivot receiving portion, so that the fork is pivotally supported by the knob.

In the above-described air-conditioning register, when the knob is slid along the downstream fin, the fork moves in the same direction together with the knob. The transmission shaft is pushed by the fork, and the upstream fins are swung about the upstream-fin pivots. The upstream fins change the flow direction of the air-conditioning air.

An air-conditioning register of a type in which the upstream fins are swung by using a knob and a fork is described in for example, Japanese Laid-Open Patent Publication No. 2016-78557.

In order to pivot the fork about the fork pivots, conventional fork pivots are formed to have an outer diameter smaller than the inner diameter of the pivot receiving holes by approximately 0.02 mm. However, if a gap exists between the fork pivot and the inner wall surface of the pivot receiving hole, the fork pivot makes noise by contacting the inner wall surface during traveling of the vehicle and disturbs the occupants. Such noise is not necessarily generated solely between the fork pivot and the inner wall surface of the pivot receiving hole, but can be generated at any position at which there is a gap between the fork and the pivot receiving portion and the fork can contact the pivot receiving portion.

SUMMARY

Accordingly, it is an objective of the present invention to provide an air-condition register that can suppress the generation of noise at the pivot receiving portions for fork pivots.

To achieve the foregoing objective, an air-conditioning register is provided that includes a retainer, which has a passage for air-conditioning air, a downstream fin, which is swingably supported by the retainer with a downstream fin pivot, a knob, which is attached to the downstream fin so as to be slidable in an extending direction of the downstream fin pivot, an upstream fin, and a fork. The upstream fin is arranged on an upstream side in a flow direction of the air-conditioning air of the downstream fin. The upstream fin is swingably supported by the retainer with an upstream fin pivot, which extends in a direction different from the downstream fin pivot, and has a transmission shaft, which extends along the upstream fin pivot, at a downstream end in the flow direction. The fork is pivotally supported by the knob while holding the transmission shaft. The fork includes two fork pivots at opposite ends in the extending direction of the downstream fin pivot, the fork pivots each extending in the extending direction of the downstream fin pivot. The knob includes two pivot receiving portions, which are separated from each other in the extending direction of the downstream fin pivot and each have a pivot receiving hole. Each fork pivot is inserted into the pivot receiving hole of the corresponding one of the pivot receiving portions. An overlapping portion is provided at least at part of a location at which the fork and each pivot receiving portion contact each other, the fork and the pivot receiving portion overlap with each other at the overlapping portion. Slits extending in the flow direction are provided at two locations between the two fork pivots of the fork. A region between each slit and the nearest one of the fork pivots constitutes an elastic support portion, which is elastically deformable at least in the extending direction of the downstream fin pivot.

BRIEF DESCRIPTION OF THE DRAWINGS

FIG. 5A is a perspective view showing a state in which the fork is attached to the knob main body in the first embodiment.

FIGS. 5B and 5C are each an enlarged partial perspective view illustrating part of FIG. 5A.

FIG. 8A is a partial cross-sectional view taken along line 8A-8A of FIG. 6.

FIG. 8B is an enlarged partial cross-sectional view showing a part of FIG. 8A.

FIG. 9 is a partial cross-sectional view taken along line 9-9 of FIG. 6.

DETAILED DESCRIPTION OF THE PREFERRED EMBODIMENTS

First Embodiment

An air-conditioning register according to a first embodiment will now be described with reference to FIGS. 1 to 9. The air-conditioning register is installed and used in a vehicle.

In the following description, the direction in which the vehicle advances (moves forward) will be referred to as the front, and the reverse direction will be referred to as the rear. The height direction of the vehicle will be referred to as the vertical direction of the vehicle. The width direction (the lateral direction) of the vehicle is defined with reference to the state in which the vehicle is viewed from the rear.

In the passenger compartment, the instrument panel (not shown) is located in front of the front seats of the vehicle (the driver's seat and the front passenger seat). The instrument panel (not shown) incorporates air-conditioning registers at the center and the sides with reference to the lateral direction. The main functions of the air-conditioning registers are to change the direction (wind direction) of air-conditioning air (warm or cold air) that is delivered from the air conditioner into the passenger compartment.

Figure 1:
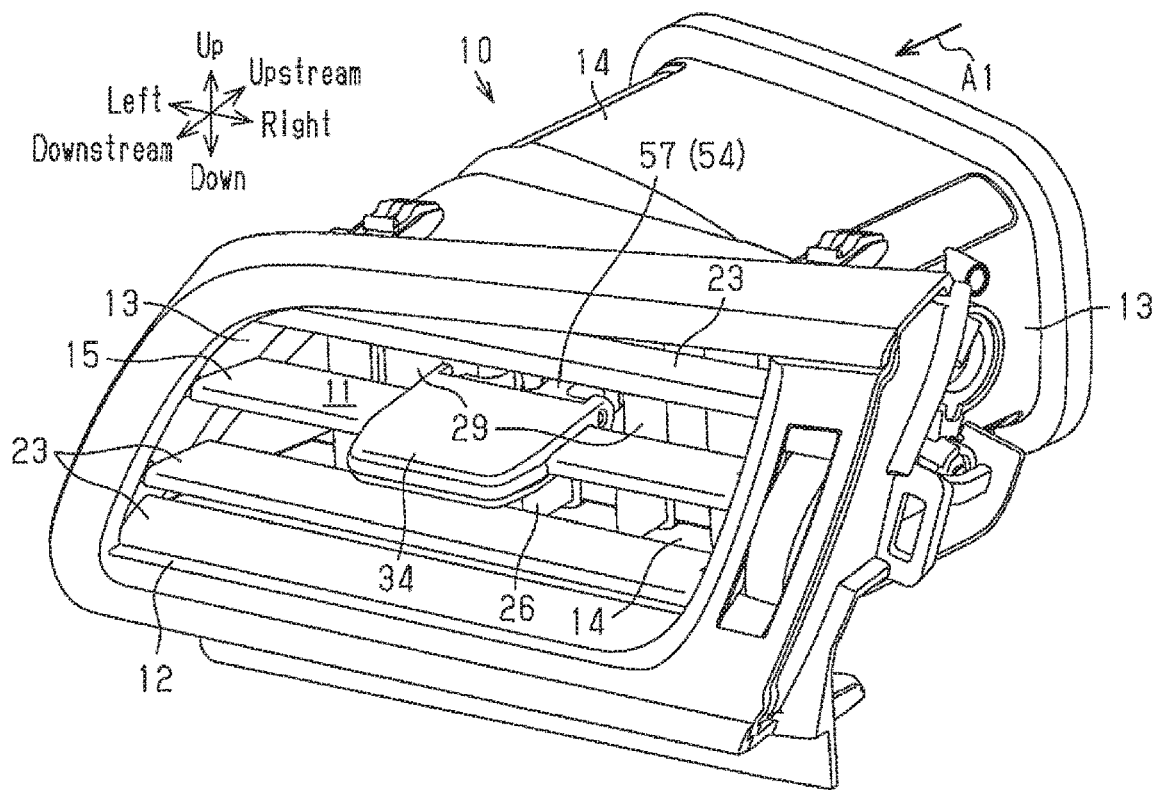
FIG. 1 is a perspective view of an entire air-conditioning register according to a first embodiment.
Figure 2:
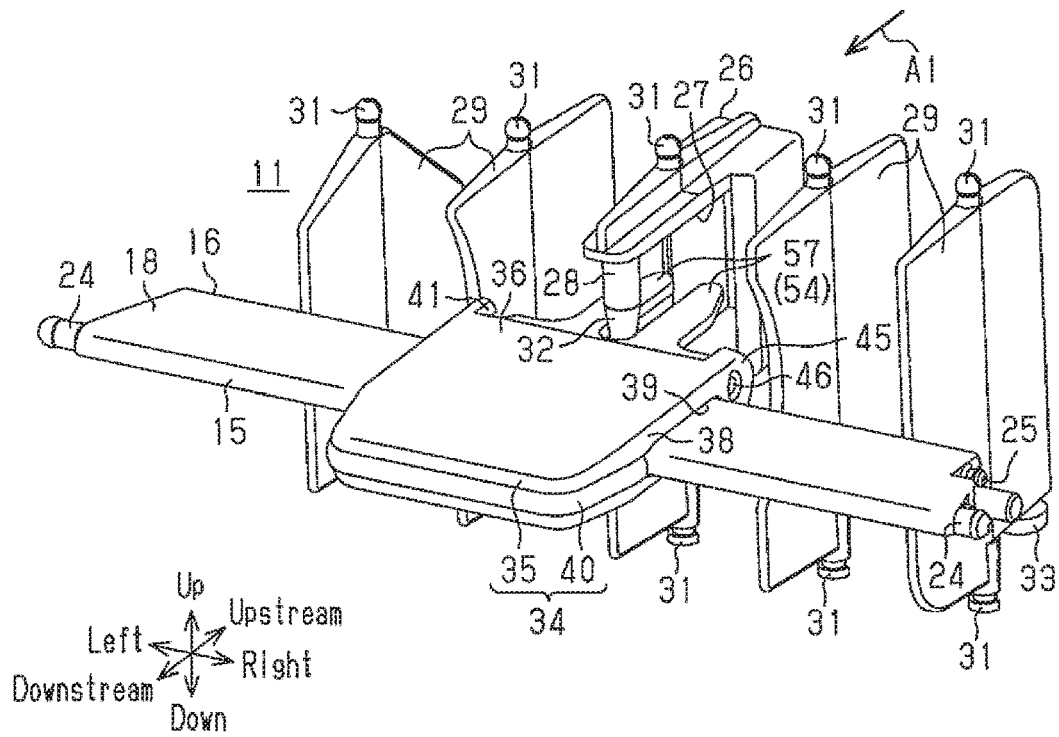
FIG. 2 is a perspective view showing the upstream fins, a downstream fin, the knob, and the fork of the air-conditioning register in FIG. 1.

As shown in FIGS. 1 and 2, each air-conditioning register includes a retainer 10, fins 34, a knob 34, and a fork 54 as basic components. These components will now be described.

<Retainer 10>

The retainer 10 is configured to connect the duct (not shown) of the air conditioner to the opening (not shown) in the instrument panel. The retainer 10 is configured by components each made of hard plastic material and has a tubular shape having open opposite ends. The internal space of the retainer 10 configures a passage (hereinafter, referred to as an "air passage 11") for air-conditioning air A1 delivered from the air conditioner. With regard to the direction in which the air-conditioning air A1 flows, the side closer to the air conditioner will be referred to as the "upstream side," and the side farther from the air conditioner will be referred to as the "downstream side." The downstream end of the air passage 11 configures an outlet port 12 for the air-conditioning air A1.

The air passage 11 is surrounded by the four walls of the retainer 10. The four walls include two vertical walls 13, which face each other in the lateral direction, and two lateral walls 14, which face each other in the vertical direction.

<Fins>

The fins include downstream fins and upstream fins.

The downstream fins are arranged in the upstream vicinity of the outlet port 12 of the air passage 11 and spaced apart in the vertical direction. To distinguish the downstream fins, the one at the center in the vertical direction will be referred to as a downstream fin 15, and the other downstream fins will be referred to as downstream fins 23.

Each of the downstream fins 15, 23 has downstream-fin pivots 24 extending outward in the lateral direction from the opposite ends in the lateral direction. Each of the downstream fins 15, 23 is supported by the left and right vertical walls 13 via the left and right downstream-fin pivots 24 to be allowed to swing vertically about the downstream-fin pivots 24.

Each of the downstream fins 15, 23 has a coupling pin 25 at a location displaced upstream from one of the downstream-fin pivots 24. The coupling pin 25 extends in parallel with the downstream-fin pivot 24. In the first embodiment, the coupling pin 25 is provided at a location displaced upstream from the right one of the left and right downstream-fin pivots 24. The coupling pins 25 of the respective downstream fins 15, 23 are coupled together by a coupling rod (not shown) extending in the vertical direction. The coupling pins 25 of the respective downstream fins 15, 23 and the coupling rod constitute a link mechanism (not shown), which mechanically couples the downstream fins 15, 23 together to swing the downstream fins 23 in a state synchronized with the downstream fin 15 so as to have the same inclination as that of the downstream fin 15.

Figure 3A:
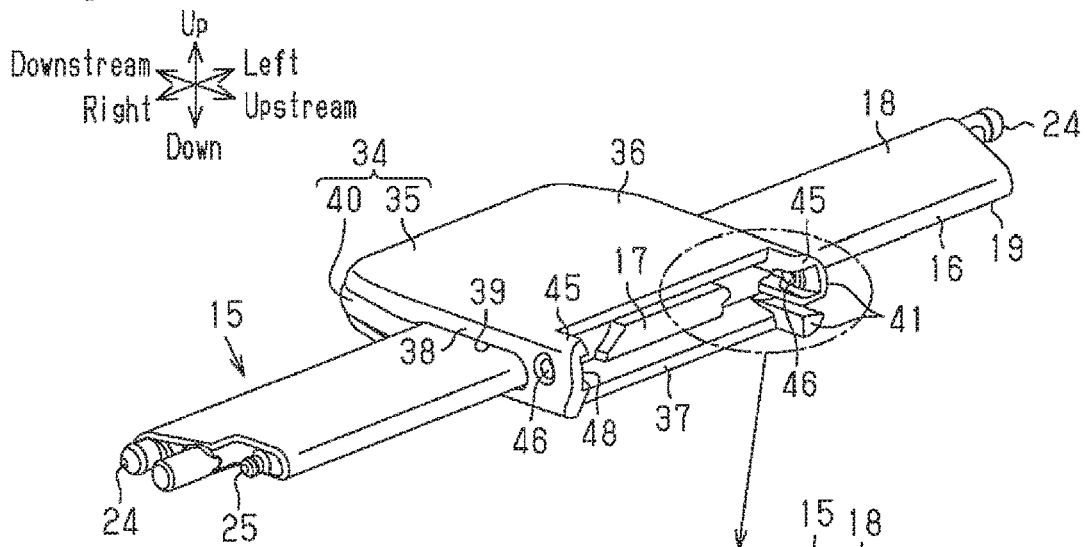
FIG. 3A is a perspective view showing a state in which the knob is attached to the downstream fin in the first embodiment.
Figure 3B:
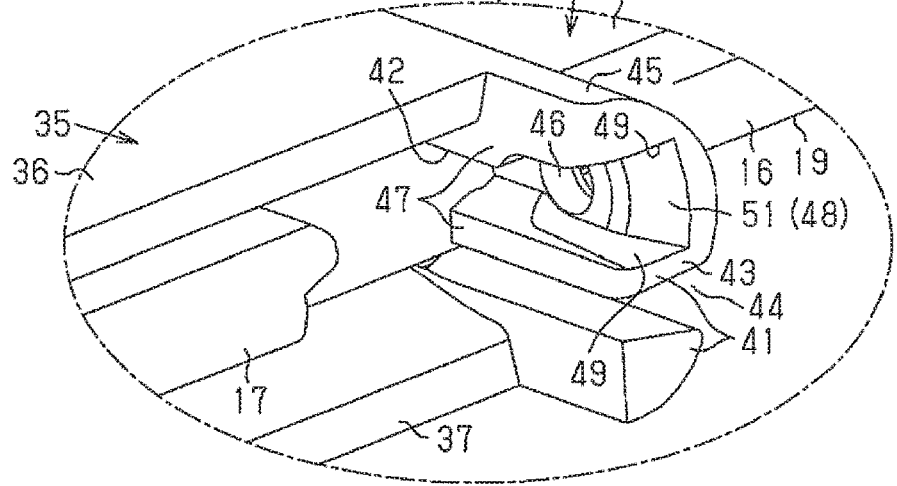
FIG. 3B is an enlarged partial perspective view illustrating part of FIG. 3A.
Figure 4:
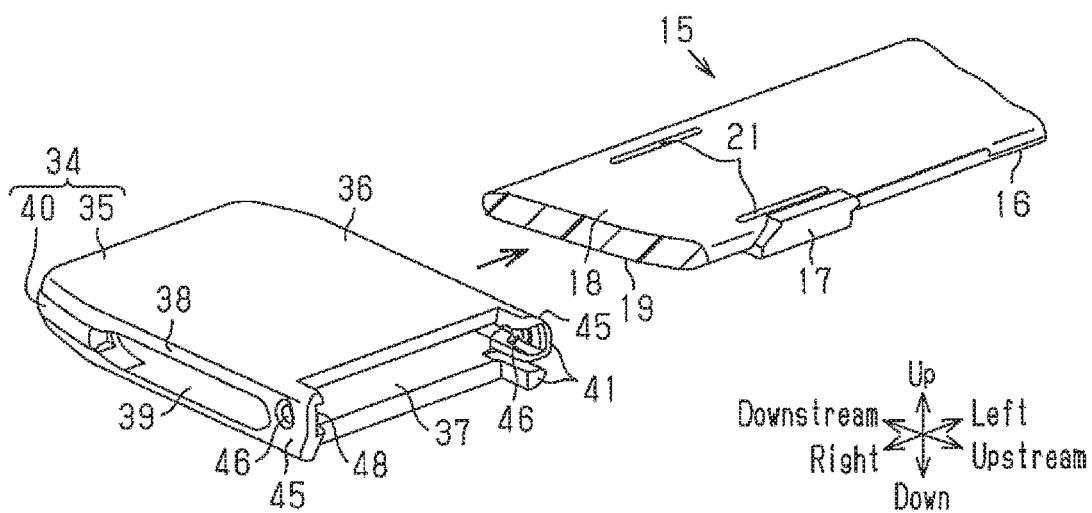
FIG. 4 is a partial perspective view showing a state before the knob is attached to the downstream fin in the first embodiment.
Figure 6:
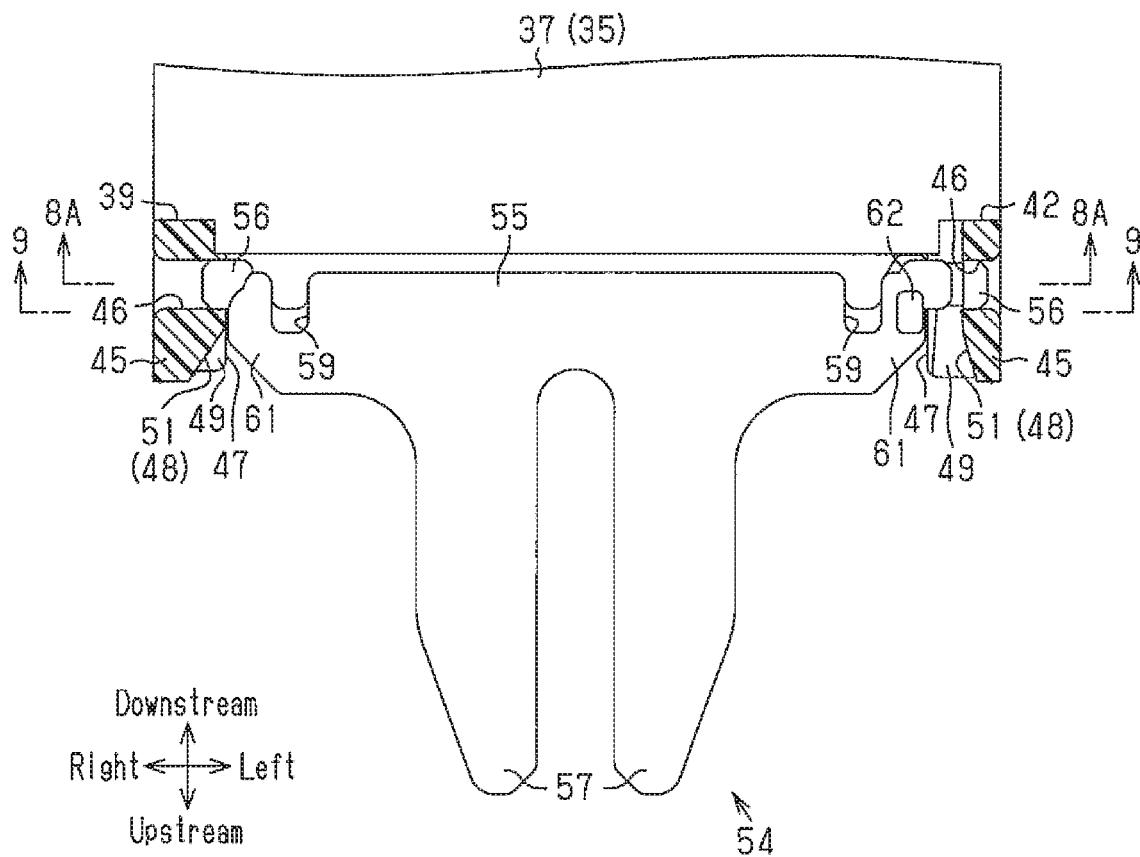
FIG. 6 is a partial cross-sectional plan view of the knob main body and the fork of FIG. 5A.

As shown in FIGS. 3A, 3B, and 4, the downstream fin 15 has an upstream edge 16, at which an integrally formed stopper 17 is provided. The stopper 17 is located in the middle section in the lateral direction and extends the same direction. The stopper 17 is configured to define the movable range of the sliding motion of the knob 34.

The downstream fin 15 has a pair of upper protrusions 21, which is located on an upper surface 18 and extends in the lateral direction. The upper protrusions 21 are located at the upstream section and the downstream section on the upper surface 18 of the downstream fin 15. Each upper protrusion 21 has an upwardly bulging curved surface. The downstream fin 15 also has a pair of lower protrusions (not shown), which is located on a lower surface 19 and extends in the lateral direction. The lower protrusions are located at locations that correspond to the upper protrusions 21. The lower protrusions are located at the upstream section and the downstream section on the lower surface 19. Each lower protrusion has a downwardly bulging curved surface. The upper protrusions 21 on the upper surface 18 and the lower protrusions on the lower surface 19 are located at locations corresponding to the stopper 17 in the lateral direction. The upper protrusions 21 and the lower protrusions are in contact with the knob 34, and generate a load (operating load) when the knob 34 is slid.

As shown in FIGS. 1 and 2, the upstream fins are arranged upstream of the downstream fins 15, 23 in the air passage 11, and are spaced apart from each other in the lateral direction. To distinguish the upstream fins, the one at the center in the lateral direction will be referred to as an upstream fin 26, and the other upstream fins will be referred to as upstream fins 29.

Each of the upstream fins 26, 29 has upstream-fin pivots 31 extending outward in the vertical direction from the opposite ends in the vertical direction. That is, the extending direction of the upstream-fin pivots 31 is a direction different from the extending direction of the downstream-fin pivots 24. In the first embodiment, the extending direction of the upstream-fin pivots 31 is a direction substantially orthogonal to the extending direction of the downstream-fin pivots 24. Each of the upstream fins 26, 29 is supported by the upper and lower lateral walls 14 via the upper and lower upstream-fin pivots 31. Therefore, each of the upstream fins 26, 29 is allowed to swing laterally about the upper and lower upstream-fin pivots 31.

Unlike the other upstream fins 29, the upstream fin 26 has a cutout portion 27 and a transmission shaft 28. The cutout portion 27 is provided in the downstream section of the upstream fin 26. The transmission shaft 28 is located at the downstream end of the cutout portion 27 and extends in the vertical direction, which is the same direction as the upstream-fin pivots 31. The transmission shaft 28 has a securing portion 32 in the middle section in the vertical direction.

A link mechanism 33 (see FIG. 2) is provided under the upstream fins 26, 29. The link mechanism 33 mechanically couples the upstream fins 26, 29 together to swing the upstream fins 29 in a state synchronized with the upstream fin 26 so as to have the same inclination as that of the upstream fin 26.

<Knob 34>

The knob 34 is a member operated by an occupant when changing the blowing direction of the air conditioning air A1 from the outlet port 12. The knob 34 is attached to the downstream fin 15 so as to be slidable in the lateral direction, which is the extending direction of the downstream-fin pivots 24.

As shown in FIGS. 1 to 3B, the knob 34 has a knob main body 35, which constitutes the framework thereof, and an auxiliary member 40 attached to the knob main body 35 from the downstream side. The knob main body 35 includes a first wall 36 arranged on the upper side of the downstream fin 15 and a second wall 37 arranged on the lower side of the downstream fin 15.

Furthermore, as shown in FIGS. 5A to 5C and 7, the knob main body 35 includes a specific-side wall 41 and a coupling-side wall 38 at locations spaced apart from each other in the lateral direction. The coupling-side wall 38 couples the first wall 36 and the second wall 37 to each other at their right ends. The coupling-side wall 38 has an insertion hole 39, through which the downstream fin 15 is inserted. The specific-side wall 41 is arranged between the left ends of the first wall 36 and the second wall 37. As shown in FIG. 3B, the specific-side wall 41 has an insertion hole 42, through which the downstream fin 15 is inserted, and is connected to the first wall 36. The specific-side wall 41 is divided into two sections in the thickness direction (vertical direction) of the downstream fin 15 by the insertion hole 42. The section of the specific-side wall 41 that comes into contact with the stopper 17 when the knob 34 slides has a separation portion 43. The separation portion 43 is separated from the second wall 37 in a state of being connected to the insertion hole 42. More specifically, the separation portion 43 is spaced from the second wall 37 via the gap 44. The gap 44 constitutes a passage for the stopper 17 when the downstream fin 15 is inserted between the first wall 36 and the second wall 37 via the insertion hole 42.

Figure 7:
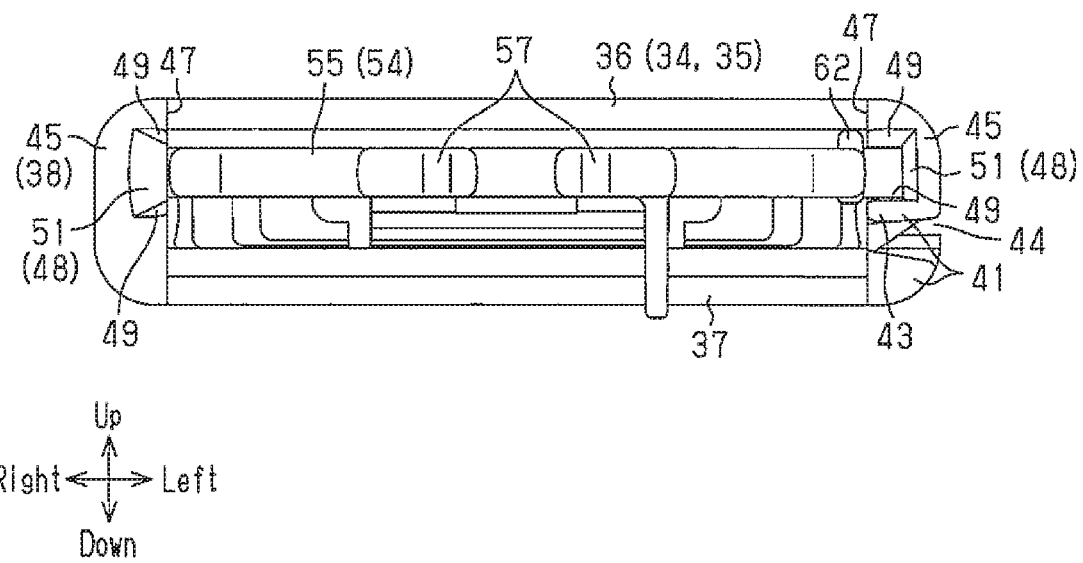
FIG. 7 is a rear view of the knob main body and the fork of FIG. 5A as viewed from the upstream side.

As shown in FIGS. 3A, 3B, and 7, the coupling-side wall 38 and the specific-side wall 41 each have a pivot receiving portion 45 in the upstream section. Each pivot receiving portion 45 has a pivot receiving hole 46. The pivot receiving hole 46 of the coupling-side wall 38 extends through the coupling-side wall 38 in the lateral direction. The pivot receiving hole 46 of the specific-side wall 41 extends through the specific-side wall 41 in the lateral direction. Each pivot receiving portion 45 has an inner wall surface 47 opposed to the other pivot receiving portion 45 on the opposite side. Each pivot receiving portion 45 has a guide groove 48 in the inner wall surface 47. Each guide groove 48 extends downstream from the upstream end face of the pivot receiving portion 45 and is connected to the pivot receiving hole 46. Each guide groove 48 includes a pair of opposed wall surfaces 49 and a bottom wall surface 51. The opposed wall surfaces 49 are opposed to each other in the vertical direction, which coincides with the thickness direction of the knob 34. The opposed wall surfaces 49 are inclined in opposite directions with respect to the flow direction of the air-conditioning air A1 such that the vertical distance in between increases as the distance from the pivot receiving hole 46 increases toward the upstream side. The bottom wall surfaces 51 of the guide grooves 48 are inclined in opposite directions with respect to the flow direction such that the lateral distance in between increases as the distance from the pivot receiving holes 46 increases toward the upstream side.

The knob main body 35, which is configured as described above, is integrally formed of a hard plastic material as a whole. That is, the knob main body 35 is composed of a single component.

<Fork 54>

The fork 54 is a member for transmitting the sliding motion of the knob 34 to the upstream fin 26 (see FIG. 2). As shown in FIGS. 5A to 5C and 6, the downstream portion of the fork 54 is constituted by an elongated plate-shaped main body portion 55, which extends in the lateral direction along the downstream-fin pivots 24. Columnar fork pivots 56 protrude outward in the lateral direction from the opposite end faces in the lateral direction of the main body portion 55. Each fork pivot 56 is rotationally inserted into the corresponding pivot receiving hole 46 in the knob main body 35. The fork 54 includes a pair of transmission prongs 57. The transmission prongs 57 extend parallel to the upstream side from locations spaced apart from each other in the lateral direction of the main body portion 55. As shown in FIG. 2, the transmission prongs 57 hold the securing portion 32 of the transmission shaft 28 from the left and right sides.

The reason why the fork 54 is configured to pivot with respect to the knob 34 is mainly to reduce the cutout portion 27 of the upstream fin 26. That is, if the fork 54 were not configured to pivot with respect to the knob 34, the size of the cutout portion 27 in the vertical direction would be inevitably enlarged in order to suppress the interference between the fork 54 and the upstream fin 26 when the knob 34 is slid in the lateral direction while being largely inclined in the vertical direction.

On the other hand, an increase in the size of the cutout portion 27 would reduce the size of the section of the upstream fin 26 that contributes to changing of the wind direction. Therefore, when the upstream fin 26 were inclined with respect to the flow direction of the air-conditioning air A1, the directivity of the air-conditioning air A1 would be reduced. Further, when the upstream fin 26 were inclined with respect to the flow direction, the cutout portion 27 would be visible from the downstream side of the air-conditioning register, and the cutout portion 27 would degrade the appearance of the upstream fin 26. The larger the cutout portion 27, the greater the degree of degradation of the appearance would become.

In contrast, pivotal connection of the fork 54 to the knob 34 allows for suppression of the interference between the fork 54 and the upstream fin 26 even if the cutout portion 27 is reduced. This suppresses the reduction in the directivity and the degradation of the appearance due to the cutout portion 27.

As shown in FIGS. 8A and 8B, at least part of the location where the fork 54 and the pivot receiving portion 45 are in contact with each other is provided with an overlapping portion 58, at which the fork 54 and the pivot receiving portions 45 overlap with each other. In the first embodiment, the overlapping portion 58 is arranged between the outer circumferential surface of each fork pivot 56 and the inner wall surface of the pivot receiving hole 46. More specifically, the outer diameter of each fork pivot 56 is set slightly larger than the inner diameter of the pivot receiving hole 46, so that the overlapping portion 58 is provided. That is, each fork pivot 56 has a large diameter portion with a larger outer diameter than the inner diameter of the pivot receiving hole 46, into which the fork pivot 56 is inserted. The overlapping portion 58 is provided between the outer circumferential surface of the large diameter portion of the fork pivots 56 and the inner wall surface of the pivot receiving hole 46. The overlapping amount L1 of the overlapping portion 58, that is, the difference between the outer diameter of the fork pivot 56 and the inner diameter of the pivot receiving hole 46 is preferably in the range from 0.01 mm to 0.05 mm from the viewpoint of suppressing the generation of noise and generating an adequate degree of friction between the fork pivot 56 and the inner wall surface of the pivot receiving hole 46. In the first embodiment, the overlapping amount L1 is set to 0.03 mm. In FIGS. 8A and 8B, the axis of the fork pivot 56 coincides with the axis of the pivot receiving hole 46. That is, FIGS. 8A and 8B show a state in which the outer circumferential surface of the fork pivot 56 overlaps with the inner wall surface of the pivot receiving hole 46 by half the overlapping amount L1 (L1/2).

As shown in FIGS. 5A to 5C and 6, the main body portion 55 has two slits 59 extending in the flow direction of the air-conditioning air A1. One of the two slits 59 is located between the left fork pivot 56 and the center of the main body 55, and the other slit 59 is located between the right fork pivot 56 and the center of the main body 55. In the first embodiment, each slit 59 is open at the downstream end of the main body portion 55 and extends toward the upstream side. The main body portion 55 has elastic support portions 61, each of which is located in a region between the slit 59 and the nearest fork pivot 56 and can be elastically deformed at least in the lateral direction.

Also, as shown in FIGS. 8A and 9, a clearance is provided between each elastic support portion 61 and the pivot receiving portion 45 adjacent to the elastic support portion 61. This clearance is provided by setting the dimension M1 between the outer wall surfaces 63 of the elastic support portions 61 to be slightly less than the dimension M2 between the inner wall surfaces 47 of the pivot receiving portions 45. More precisely, the outer wall surface 63 is a section of the elastic support portion 61 onto which the side portion of the pivot receiving hole 46 in the opposed wall surface 49 is projected.

As shown in FIGS. 5B and 9, the left elastic support portion 61 has a restricting portion 62. The restricting portion 62 is provided across part of the fork pivot 56 and part upstream of the fork pivot 56 in the flow direction of the air-conditioning air A1 (see FIG. 6). The restricting portion 62 is constituted by a projection projecting upward from the upper surface of the elastic support portion 61.

The operation and advantages of the first embodiment, which is configured as described above, will now be described for each situation.

The operation and advantages at the time of assembling the fork 54 to the knob 34 will be described below.

In this assembling operation, as shown in FIGS. 3B and 5A to 5C, the fork 54 is brought closer to the knob 34 from the upstream side with the transmission prongs 57 positioned on the upstream side of the main body 55. Each fork pivot 56 is engaged with the guide groove 48 of the corresponding pivot receiving portion 45. The fork pivots 56 are guided to the pivot receiving holes 46 by being moved downstream along the guide grooves 48. That is, the upper and lower opposed wall surfaces 49 of the guide groove 48 are inclined with respect to the flow direction of the air-conditioning air A1 such that the distance between the opposed wall surfaces 49 decreases toward the downstream side. Therefore, when each fork pivot 56 is moved downstream while contacting one of the opposed wall surfaces 49 of the corresponding guide groove 48, the fork pivot 56 is guided to the pivot receiving hole 46.

The lateral distance between the bottom wall surface 51 of one of the guide grooves 48 and the bottom wall surface 51 of the opposed guide groove 48 is narrowed toward the downstream side. Therefore, when the fork pivots 56 are moved downstream while contacting the bottom wall surfaces 51, each elastic support portion 61 receives a force directed to the other elastic support portion 61 on the opposite side. The force elastically deforms each elastic support portion 61 toward the other elastic support portion 61 on the opposite side. As a result, the distance between the fork pivots 56 is reduced.

When the fork pivots 56 pass through the bottom wall surfaces 51 and are moved to the pivot receiving holes 46, the force acting to deform the elastic support portions 61 disappears, and the elastic support portions 61 act to return to the original shapes due to the elastic restoring force. Each fork pivot 56 is inserted into the corresponding pivot receiving hole 46.

In the first embodiment, as shown in FIGS. 8A and 8B, both fork pivots 56 are formed to have a larger outer diameter than the inner diameter of the pivot receiving holes 46, so that an overlapping portion 58 is provided between the outer circumferential surface of each fork pivot 56 and the inner wall surface of the pivot receiving hole 46. Therefore, upon insertion, the outer circumferential surface of each fork pivot 56 is pressed against the inner wall surface of the pivot receiving hole 46 in the radial direction.

There may be a situation where, after the two fork pivots 56 are each guided to the pivot receiving hole 46 along the guide groove 48, the right fork pivot 56 is inserted only halfway through the corresponding pivot receiving hole 46. This situation may arise due to the friction generated when the fork pivot 56 is inserted into the pivot receiving hole 46 depending on the setting of the overlapping portion 58.

In such a situation, the left fork pivot 56 is excessively inserted into the corresponding pivot receiving hole 46. Accordingly, in the elastic support portion 61 provided with the left fork pivot 56, a portion on the upstream side of the fork pivots 56 may enter the guide groove 48. In this state, although both fork pivots 56 are inserted in the pivot receiving holes 46, it is difficult to pivot the fork 54 around the fork pivots 56.

In this regard, in the first embodiment, as shown in FIG. 9, the restricting portion 62 restricts the left elastic support portion 61 from entering the guide groove 48 of the left pivot receiving portion 45, which is the nearest pivot receiving portion 45. That is, the thickness (the vertical dimension M3) of the elastic support portion 61 is larger than the other sections by the amount corresponding to the restricting portion 62 at the location where the restricting portion 62, which is a projection, is provided. Thus, at the location where the restricting portion 62 is provided, the thickness of the elastic support portion 61 is made larger than the dimension M4 between the opposed wall surfaces 49 in the vicinity and upstream of the pivot receiving hole 46. Therefore, when the restricting portion 62 abuts against the inner wall surface 47 of the pivot receiving portion 45, the elastic support portion 61 is restricted from entering the guide groove 48. This restriction allows the fork pivots 56 to be inserted to the pivot receiving holes 46 by adequate amounts.

Then, when each fork pivot 56 is inserted into the corresponding pivot receiving hole 46, the fork 54 is coupled to the knob 34 via the fork pivots 56 and the pivot receiving portions 45. As a result, the fork 54 can pivot vertically around the fork pivots 56.

The operation and advantages at the time of operating the knob 34 will be described below.

When laterally changing the blowing direction of the air-conditioning air A1, the knob 34 shown in FIGS. 1 to 3B is slid laterally along the downstream fin 15. The movable range of the sliding motion of the knob 34 is defined by the coupling-side wall 38 contacting one end of the stopper 17 and the specific-side wall 41 contacting the other end of the stopper 17.

During the sliding operation, the first wall 36 slides against the upper protrusions 21 (see FIG. 4) formed on the upper surface 18 of the downstream fin 15. Likewise, the second wall 37 slides against the lower protrusions formed on the lower surface 19 of the downstream fin 15. The sliding resistance generated between the first wall 36 and the upper protrusions 21 and the sliding resistance generated between the second wall 37 and the lower protrusions generate the load (operating load) at the time of sliding operation of the knob 34.

When the knob 34 is slid as described above, the movement of the knob 34 is transmitted to the upstream fin 26 via the fork 54 and the transmission shaft 28. The transmission shaft 28 is pushed by the transmission prong 57 on the trailing side in the sliding direction of the knob 34, so that the upstream fin 26 is swung in the same direction as the sliding direction of the knob 34 around the upper and lower upstream-fin pivots 31. The swinging motion of the upstream fin 26 is transmitted to all the other upstream fins 29 via the link mechanism 33. As a result, in conjunction with the upstream fin 26, all the other upstream fins 29 are swung in the same direction as the upstream fin 26 about the upper and lower upstream-fin pivots 31. In the course of passing through the air passage 11, the air-conditioning air A1 flows along the swung upstream fins 26 and 29, so that the flow direction is changed.

At this time, the angle of the upstream fin 26 with the transmission prongs 57 of the fork 54 changes. However, since the change in the angle is performed in the cutout portion 27, the interference between the upstream fin 26 and the fork 54 is suppressed.

In contrast, when changing the blowing direction of the air-conditioning air A1 in the vertical direction, a force in the thickness direction (vertical direction) of the downstream fin 15 is applied to the knob 34. This force is transmitted to the downstream fin 15, to which the knob 34 is attached. The downstream fin 15 is swung about the left and right downstream-fin pivots 24. The swinging action of the downstream fin 15 is transmitted to all the remaining downstream fins 23 via the link mechanism. As a result, in conjunction with the downstream fin 15 operated through the knob 34, all the remaining downstream fins 23 are swung in the same direction as the operated downstream fin 15 about the left and right downstream-fin pivots 24. The air-conditioning air A1, which has passed through the upstream fins 26, 29, flows along the swung downstream fins 15, 23, so that the flow direction is changed.

At this time, the fork 54 pivots with respect to the knob 34 at the fork pivots 56, and the transmission prongs 57 slide against the securing portion 32, so that the force is not transmitted to the transmission shaft 28. The upstream fin 26 is therefore not swung.

The air-conditioning air A1 flows in a direction corresponding to the inclinations of the upstream fins 26, 29 and the downstream fins 15, 23, and is blown out from the outlet port 12. In this way, at least one of the set of the upstream fins 26, 29 and the set of the downstream fins 15, 23 is swung through an operation of the knob 34, so that the direction of the air-conditioning air A1 blown out from the outlet port 12 is changed.

The operation and advantages at the time of driving the vehicle will be described below.

In the first embodiment, as shown in FIG. 8B, the overlapping portion 58, which is provided between the outer circumferential surface of each fork pivot 56 and the inner wall surface of the pivot receiving hole 46, causes the fork pivot 56 to be pressed against the inner wall surface in the radial direction.

The pressing maintains each fork pivot 56 in a state of contacting the inner wall surface. Therefore, each fork pivot 56 is restricted from separating in the radial direction from the inner wall surface of the pivot receiving hole 46. As a result, even if vibration that accompanies driving of the vehicle is transmitted to the air-conditioning register, particularly to the pivot receiving portion for the knob 34 of the fork 54, the fork pivot 56, which is separated from the inner wall surface of the pivot receiving hole 46, is prevented from coming into contact with the inner wall surface and generating noise.

In addition, the pressing also restricts each fork pivot 56 from moving in the lateral direction. The outer wall surface 63 of the elastic support portion 61 is restricted from contacting or separating from the inner wall surface 47 of the pivot receiving portion 45. Therefore, it is also possible to suppress the generation of noise due to contact and separation between the outer wall surface 63 of the elastic support portion 61 and the inner wall surface 47 of the pivot receiving portion 45.

In addition to the ones listed above, the first embodiment achieves the following advantages.

In a case in which the knob main body 35 including the pivot receiving portions 45 is constituted by a single component, a pair of fork pivots 56 can only be inserted into a pair of pivot receiving holes 46 from the extending direction of the downstream-fin pivots 24, unlike the case in which the pivot receiving holes 46 are formed by assembling multiple components. In this regard, in the first embodiment, the elastic support portions 61 are elastically deformed to narrow the distance between the fork pivots 56, thereby inserting the fork pivots 56 into the pivot receiving holes 46. Therefore, the configuration of the first embodiment is particularly effective when employed in a knob 34 of a type in which the knob main body 35 is constituted by a single component.

Second Embodiment

Next, an air-conditioning register according to a second embodiment will be described with reference to FIGS. 10A to 10C.

In the second embodiment, an overlapping portion is provided in a location different from that of the first embodiment on condition that the fork 54 and the pivot receiving portions 45 are in contact with each other.

Figure 10B:
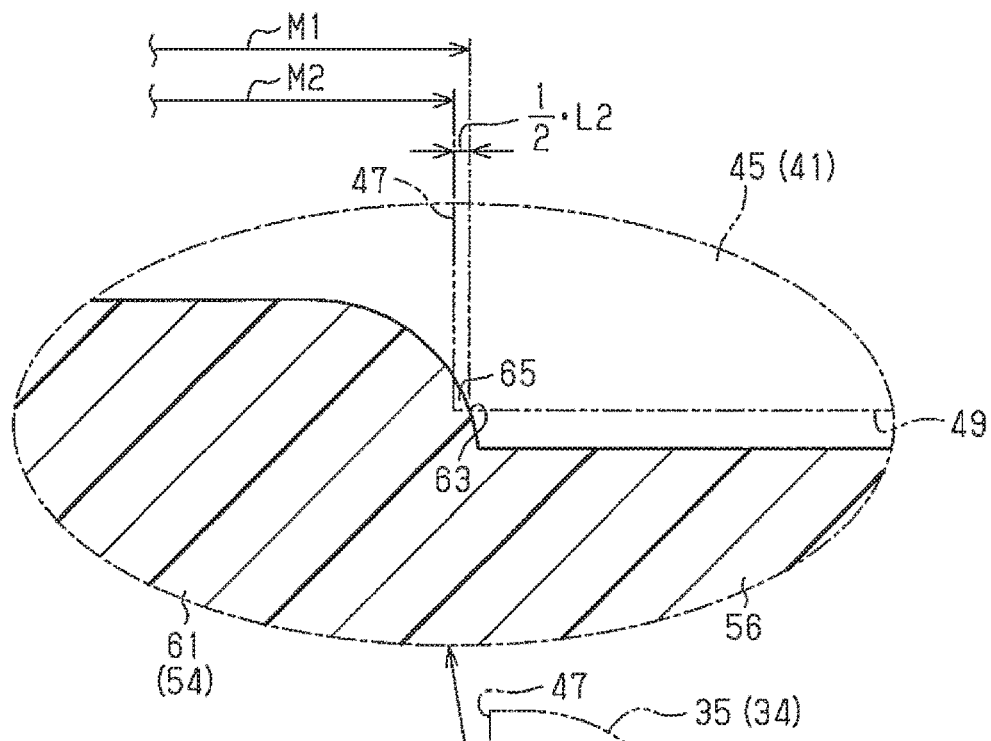
FIGS. 10B and 10C are each an enlarged partial cross-sectional view illustrating part of FIG. 10A.
Figure 10A:
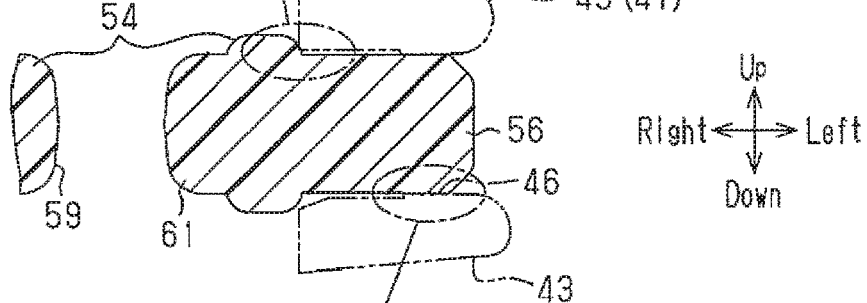
FIG. 10A is a partial cross-sectional view corresponding to FIG. 8A, showing a second embodiment.
Figure 10C:
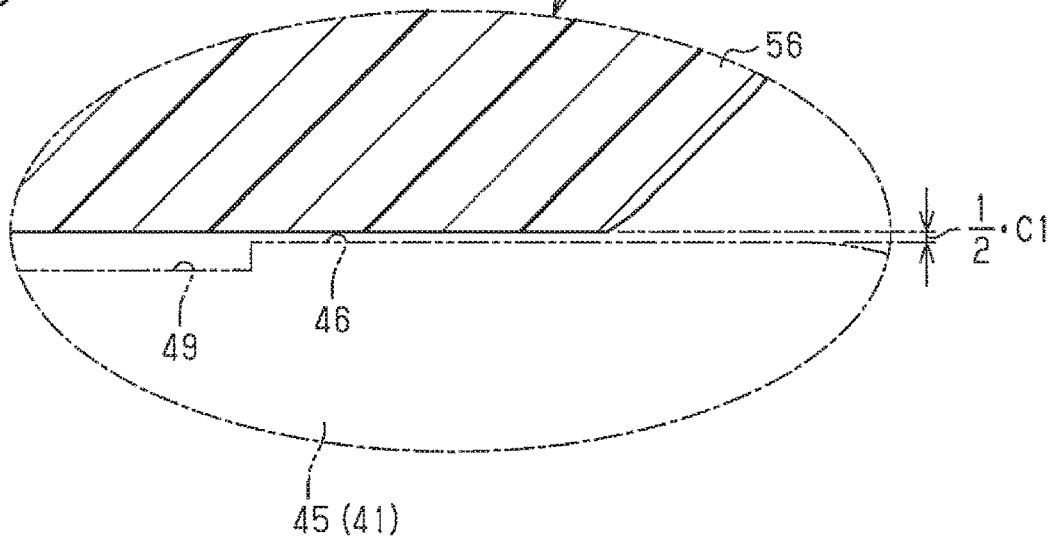

More specifically, as shown in FIGS. 10A and 10C, an annular clearance is provided between the fork pivot 56 and the inner wall surface of the pivot receiving hole 46. The outer diameter of the fork pivot 56 is set slightly smaller than the inner diameter of the pivot receiving hole 46, so that the annular clearance is provided. The clearance amount C1, that is, the difference between the outer diameter of the fork pivot 56 and the inner diameter of the pivot receiving hole 46 is preferably from 0.01 mm to 0.05 mm from the viewpoint of suppression of the occurrence of noises and smooth insertion the fork pivot 56 into the pivot receiving hole 46, allowing the fork pivot 56 to pivot without trouble. In the second embodiment, the clearance amount C1 is set to 0.02 mm. In FIGS. 10A and 10C, the axis of the fork pivot 56 coincides with the axis of the pivot receiving hole 46. That is, FIGS. 10A and 10C show a state in which the outer circumferential surface of the fork pivot 56 is spaced apart radially inward from the inner wall surface of the pivot receiving hole 46 by half the clearance amount C1 (C1/2).

Also, as shown in FIGS. 10A and 10B, an overlapping portion 65 is provided between each elastic support portion 61 and the pivot receiving portion 45 adjacent to the elastic support portion 61. Specifically, the overlapping portion 65 is provided by setting the dimension M1 between the outer wall surfaces 63 of the two elastic support portions 61 to be slightly larger than the dimension M2 between the inner wall surfaces 47 of the two pivot receiving portions 45. As in the first embodiment, the outer wall surface 63 is a section of the elastic support portion 61 onto which the side portion of the pivot receiving hole 46 in the opposed wall surface 49 is projected.

The overlapping amount L2 of the overlapping portion 65, that is, the difference between the dimension M1 and the dimension M2 is preferably in the range from 0.01 mm to 0.10 mm. In the second embodiment, the overlapping amount L2 is set to 0.10 mm. FIG. 10B shows a state in which the outer wall surface 63 of the left elastic support portion 61 overlaps with the inner wall surface 47 of the left pivot receiving portion 45 by half the overlapping amount L2 (L2/2).

Other than the above described differences, the second embodiment is the same as the first embodiment. Thus, like or the same reference numerals are given to those components that are like or the same as the corresponding components described above in the first embodiment and detailed explanations are omitted.

Therefore, in the second embodiment, when each fork pivot 56 has a smaller outer diameter than the inner diameter of the corresponding pivot receiving hole 46, an overlapping portion 65 is provided between each elastic support portion 61 and the corresponding pivot receiving portion 45, so that the respective elastic support portions 61 are pressed against the corresponding pivot receiving portions 45 in the lateral direction. This pressing maintains each elastic support portion 61 in a state of contacting the adjacent pivot receiving portion 45. Thus, the elastic support portions 61 are restricted from separating from the pivot receiving portions 45 in the lateral direction. This suppresses the generation of noise that would be otherwise generated by the separated elastic support portion 61 moving in the lateral direction and contacting the pivot receiving portion 45.

In addition, due to the pressing, the fork pivots 56 are restricted from moving in the radial direction. Each fork pivot 56 is restricted from contacting or separating from the inner wall surface of the pivot receiving hole 46. This suppresses the generation of noise due to contact and separation between the fork pivot 56 and the inner wall surface of the pivot receiving hole 46.

Although the overlapping portion 65 is provided at a location different from the overlapping portion 58 of the first embodiment in the second embodiment, generation of noise is suppressed in the similar manner as in the first embodiment.

It should be apparent to those skilled in the art that the present invention may be embodied in many other specific forms without departing from the scope of the invention. Particularly, it should be understood that the present invention may be embodied in the following forms.

<Regarding Knob 34>

The pivot receiving hole 46 in the knob main body 35 may be formed by assembling multiple components. This configuration also achieves the effect of suppressing the generation of sounds at the pivot receiving portions of fork pivots 56.

The bottom wall surface 51 of one of the guide grooves 48 may be formed to be parallel with the flow direction of the air-conditioning air A1, and only the other may be inclined with respect to the flow direction.

One of the opposed wall surfaces 49 of each guide groove 48 may be formed to be parallel with the flow direction of the air-conditioning air A1, and only the other may be inclined with respect to the flow direction.

Each pivot receiving hole 46 may extend through the pivot receiving portion 45. Also, each pivot receiving hole 46 does not necessarily need to extend through the pivot receiving portion 45.

In the first embodiment, an enlarged diameter portion having an outer diameter larger than those of the other portions of each fork pivot 56 may be provided in a part in the direction (lateral direction) along the axis of the fork pivot 56, and the outer diameter of the enlarged diameter portion may be set to be larger than the inner diameter of the pivot receiving hole 46, so that an overlapping portion 58 is provided between the outer circumferential surface of the enlarged diameter portion and the inner wall surface of the pivot receiving hole 46. In this case, the enlarged diameter portion corresponds to the large diameter portion of the fork pivot 56, which has an outer diameter larger than the inner diameter of the pivot receiving hole 46.

<Regarding Fork 54>

Both left and right elastic support portions 61 may each have a restricting portion 62.

The restricting portion 62 may be provided only on the lower side of the elastic support portion 61. Also, restricting portions 62 may be provided on both of the upper and lower sides of the elastic support portion 61.

The entire restricting portion 62 may be provided upstream of the fork pivot 56.

Contrary to the first and second embodiments, the slit 59 may be changed to one extending from the upstream end face of the main body portion 55 toward the downstream side. However, from the viewpoint of suppression of turbulence of the flow of the air-conditioning air A1, it is preferable that the slit 59 extend from the downstream end face of the main body portion 55 toward the upstream side.

The elastic support portion 61 may have any configuration as long as it is elastically deformable at least in the lateral direction, which is the extending direction of the downstream-fin pivots 24. Therefore, the elastic support portion 61 may be elastically deformable only in the lateral direction, or may be elastically deformable in other directions in addition to the lateral direction.

<Regarding Overlapping Portion>

In addition to the overlapping portion 58 provided between the outer circumferential surface of the fork pivot 56 and the inner wall surface of the pivot receiving hole 46, an overlapping portion 65 may be provided between each elastic support portion 61 and the pivot receiving portion 45 adjacent to the elastic support portion 61.

<Regarding Fins>

The transmission shaft 28 in the upstream fin 26 may be slightly inclined with respect to the extending direction of the upstream-fin pivots 31.

Contrary to the first and second embodiments, plate-shaped members extending in the lateral direction may be used as the upstream fins 26, 29, and plate-shaped members extending in the vertical direction may be used as the downstream fins 15, 23.

<Regarding Applicability>

The air-conditioning register may be provided at a location in the passenger compartment other than the instrument panel.

As long as the above-described air-conditioning register changes the direction of the air-conditioning air that is delivered from an air conditioner and blown out from the outlet port into a room, the air-conditioning register may be employed in a wide range of apparatuses other than vehicles.

The present examples and embodiments are to be considered as illustrative and not restrictive, and the invention is not to be limited to the details given herein, but may be modified within the scope and equivalence of the appended claims.

The invention claimed is:

1. An air-conditioning register comprising:
   a retainer, which has a passage for air-conditioning air;
   a downstream fin, which is swingably supported by the retainer with a downstream fin pivot;
   a knob, which is attached to the downstream fin so as to be slidable in an extending direction of the downstream fin pivot;
   an upstream fin, which is arranged on an upstream side in a flow direction of the air-conditioning air of the downstream fin, wherein the upstream fin is swingably supported by the retainer with an upstream fin pivot, which extends in a direction different from the downstream fin pivot, and has a transmission shaft, which extends in a direction paralleling with the upstream fin pivot, at a downstream end in the flow direction; and
   a fork, which is pivotally supported by the knob while holding the transmission shaft, wherein:
   the fork includes two fork pivots at opposite ends in the extending direction of the downstream fin pivot, the fork pivots each extending in the extending direction of the downstream fin pivot,
   the knob includes two pivot receiving portions, which are separated from each other in the extending direction of the downstream fin pivot and each have a pivot receiving hole,
   each fork pivot is inserted into the pivot receiving hole of the corresponding one of the pivot receiving portions,
   an overlapping portion is provided at least at part of a location at which the fork and each pivot receiving portion contact each other, the fork and the pivot receiving portion overlap with each other at the overlapping portion,
   slits extending in the flow direction are provided at two locations between the two fork pivots of the fork,
   a region between each slit and the nearest one of the fork pivots constitutes an elastic support portion, which is elastically deformable at least in the extending direction of the downstream fin pivot,
   each fork pivot includes a large diameter portion, which has an outer diameter larger than an inner diameter of the corresponding pivot receiving hole, into which the fork pivot is inserted, and
   each overlapping portion is arranged between an outer circumferential surface of the large diameter portion of one of the fork pivots and an inner wall surface of the corresponding pivot receiving hole.

2. The air-conditioning register according to claim 1, wherein:
   each pivot receiving portion has an inner wall surface, which is opposed to the other pivot receiving portion,
   the inner wall surface of each pivot receiving portion has a guide groove, which extends downstream from an upstream end face in the flow direction of the pivot receiving portion to be connected to the corresponding pivot receiving hole, and is configured to guide the corresponding fork pivot to the pivot receiving hole,
   at least one of the elastic support portions includes a restricting portion, which restricts the elastic support portion from entering the guide groove of the nearest one of the pivot receiving portion, and
   at least part of the restricting portion is provided on an upstream side in the flow direction of the fork pivot.

3. The air-conditioning register according to claim 2, wherein
   the restricting portion is constituted by a projection that is located on at least one surface of the corresponding elastic support portion in a thickness direction of the fork, the projection projecting in the thickness direction.

4. An air-conditioning register comprising:
   a retainer, which has a passage for air-conditioning air;
   a downstream fin, which is swingably supported by the retainer with a downstream fin pivot;
   a knob, which is attached to the downstream fin so as to be slidable in an extending direction of the downstream fin pivot;
   an upstream fin, which is arranged on an upstream side in a flow direction of the air-conditioning air of the downstream fin, wherein the upstream fin is swingably supported by the retainer with an upstream fin pivot, which extends in a direction different from the downstream fin pivot, and has a transmission shaft, which extends in a direction paralleling with the upstream fin pivot, at a downstream end in the flow direction; and
   a fork, which is pivotally supported by the knob while holding the transmission shaft, wherein:
   the fork includes two fork pivots at opposite ends in the extending direction of the downstream fin pivot, the fork pivots each extending in the extending direction of the downstream fin pivot,
   the knob includes two pivot receiving portions, which are separated from each other in the extending direction of the downstream fin pivot and each have a pivot receiving hole,
   each fork pivot is inserted into the pivot receiving hole of the corresponding one of the pivot receiving portions,
   an overlapping portion is provided at least at part of a location at which the fork and each pivot receiving portion contact each other, the fork and the pivot receiving portion overlap with each other at the overlapping portion,
   slits extending in the flow direction are provided at two locations between the two fork pivots of the fork,
   a region between each slit and the nearest one of the fork pivots constitutes an elastic support portion, which is elastically deformable at least in the extending direction of the downstream fin pivot,
each fork pivot includes an outer diameter that is smaller than an inner diameter of the pivot receiving hole, into which the fork pivot is inserted, and
each overlapping portion is arranged between one of the elastic support portion and the pivot receiving portion adjacent to that elastic support portion.

5. An air-conditioning register comprising:
a retainer, which has a passage for air-conditioning air;
a downstream fin, which is swingably supported by the retainer with a downstream fin pivot;
a knob, which is attached to the downstream fin so as to be slidable in an extending direction of the downstream fin pivot;
an upstream fin, which is arranged on an upstream side in a flow direction of the air-conditioning air of the downstream fin, wherein the upstream fin is swingably supported by the retainer with an upstream fin pivot, which extends in a direction different from the downstream fin pivot, and has a transmission shaft, which extends in a direction paralleling with the upstream fin pivot, at a downstream end in the flow direction; and
a fork, which is pivotally supported by the knob while holding the transmission shaft, wherein:
the fork includes two fork pivots at opposite ends in the extending direction of the downstream fin pivot, the fork pivots each extending in the extending direction of the downstream fin pivot,
the knob includes two pivot receiving portions, which are separated from each other in the extending direction of the downstream fin pivot and each have a pivot receiving hole,
each fork pivot is inserted into the pivot receiving hole of the corresponding one of the pivot receiving portions,
an overlapping portion is provided at least at part of a location at which the fork and each pivot receiving portion contact each other, the fork and the pivot receiving portion overlap with each other at the overlapping portion,
slits extending in the flow direction are provided at two locations between the two fork pivots of the fork,
a region between each slit and the nearest one of the fork pivots constitutes an elastic support portion, which is elastically deformable at least in the extending direction of the downstream fin pivot,
the knob includes a framework that is constituted by a knob main body having the pivot receiving holes, and the knob main body is composed of a single component.

* * * * *